(12) United States Patent
Calvert (10) Patent No.: US 6,906,982 B2
(45) Date of Patent: Jun. 14, 2005

(54) MARINE TIME-LAPSE SEISMIC SURVEYING

(75) Inventor: Rodney William Calvert, Rijswijk (NL)

(73) Assignee: Shell Oil Company, Houston, TX (US)

( * ) Notice: Subject to any disclaimer, the term of this patent is extended or adjusted under 35 U.S.C. 154(b) by 241 days.

(21) Appl. No.: 10/413,247

(22) Filed: Apr. 14, 2003

(65) Prior Publication Data

US 2003/0218938 A1 Nov. 27, 2003

Related U.S. Application Data

(60) Provisional application No. 60/372,960, filed on Apr. 16, 2002.

(51) Int. Cl.$^7$ .............................. G01V 1/38; G01V 1/00
(52) U.S. Cl. .............................. 367/21; 367/15; 367/24; 367/73; 702/17
(58) Field of Search .............................. 367/13, 15, 21, 367/24, 27, 43, 56; 702/17

(56) References Cited

U.S. PATENT DOCUMENTS

| | | | | |
|---|---|---|---|---|
| 4,887,243 A | * | 12/1989 | Pann | 367/24 |
| 5,521,881 A | * | 5/1996 | Lau et al. | 367/24 |
| 5,586,082 A | * | 12/1996 | Anderson et al. | 367/73 |
| 5,946,271 A | * | 8/1999 | Dragoset, Jr. | 367/38 |
| 6,574,563 B1 | * | 6/2003 | Nickel | 702/14 |

FOREIGN PATENT DOCUMENTS

| | | | |
|---|---|---|---|
| WO | 98/11455 | 3/1998 | |
| WO | 99/67660 | 12/1999 | |
| WO | WO 02/075363 | 9/2002 | G01V/1/38 |
| WO | 2075363 | 9/2002 | G01V/1/38 |

OTHER PUBLICATIONS

Christopher P. Ross and M. Suat Altan, "Time–Lapse Seismic Monitoring: Some Shortcomings in Nonuniform Processing", The Leading Edge, Jun. 1997, pp. 1021–1027.
Ross, C., Suat Altan, M., *Time–lapse seismic monitoring: Some shortcomings in nonuniform processing*, Jun. 1997, The Leading Edge pp. 1021–1027.
A Tutorial on Time–Lapse Seismic Reservoir Monitoring, Apr. 16, 2003.
Seismic Reservoir Monitoring on Gullfaks, Apr. 16, 2003.
Search Report dated Mar. 19, 1998.

* cited by examiner

Primary Examiner—Thomas H. Tarcza
Assistant Examiner—Scott A. Hughes
(74) Attorney, Agent, or Firm—William E. Hickman (57) ABSTRACT

A method for making a time-lapse seismic survey in a marine environment, the method designed to eliminate multiple surface reflections and changes in sea state and conditions. Seismic sources and receivers are positioned at predetermined conditions for a first set of data in which at least two sets of seismic signals are recorded at each receiver, proximate in time, such that there are insignificant changes in the subsurface formation. At a later point in time the seismic source(s) and receiver(s) are positioned at the same place when the first seismic data set was generated. A seismic source emits a sound wave and the seismic receiver receives what will be called a "monitor signal" and the two-way water travel time is again determined. A model is then developed for the first and second seismic data sets in that includes the subsurface signal, changes in the subsurface signal and the effect of multiple reflections. A set of filter functions are then developed to filter out the multiple reflections based on the two-way water travel times of the first seismic data set. The first seismic data set, the second seismic data set and the filter function are then used to calculate the differences in the subsurface layers over the elapsed period of time between the two seismic data sets.

9 Claims, 5 Drawing Sheets

MARINE TIME-LAPSE SEISMIC SURVEYING

PRIORITY CLAIM

The present invention claims priority on U.S. Provisional Application 60/372,960, filed 16 Apr. 2002.

FIELD OF THE INVENTION

The present invention relates to time-lapse seismic surveying of a subterranean formation, more particularly, a method for time lapse-marine surveying in which changes in sea-state between survey sets are filtered to provide more accurate information regarding changes in the subterranean formation.

BACKGROUND OF THE INVENTION

Time-lapse seismic surveying or monitoring involves obtaining seismic data of the same part of the subterranean formation at different times. It allows studying the changes in seismic properties of the formation as a function of time due to for example fluid flow through the underground formation, spatial and temporal variation in fluid saturation, pressure and temperature. Seismic data can be combined to generate images that show the changes. The time-lapse seismic surveying technique has applications such as mapping bypassed oil, monitoring injected reservoir fluids such as water, steam and $CO_2$, and estimating fluid-flow heterogeneity related to pressure compartmentalization, and the hydraulic properties of faults and fractures. Time-lapse seismic surveying is also called 4-dimensional seismic surveying.

In the following discussion, the term "signal" is used to refer to raw, unprocessed data as well as to processed data, and the term "subsurface signal" is used to refer to a signal that contains information from the subsurface only, and does not include surface multiple reflections. This subsurface signal is also called the primary signal. The target layer in the subsurface is a layer or a number of layers in which one is interested. In the latter case, the layers can be separated by layers that are not of interest.

It is well known that repeatability is the key to the success of time-lapse seismic surveying, and that major concerns are source and receiver locations (see for example the article C P Ross and M S Altan, Time-lapse Seismic Monitoring: Some Shortcomings in Non-Uniform Processing, The Leading Edge, June 1997). Other concerns are source and receiver waveform responses and coupling, and various forms of undesired noise. Other factors that adversely affect the accuracy of time-lapse surveys in a marine environment are the changes in the sea state and properties of the sea.

In Applicant's co-pending International patent application publication No. WO02/075 363 discusses the effect of so-called surface multiple reflections. The surface multiple reflections are contributions to the recorded signal caused by multiple reflections of the seismic energy between the surface of the sea and the sea bottom. In this patent application it is explained that the surface multiple reflections do not repeat, so that when subtracting two signals, recorded at different dates, the difference signal contains an unknown contribution from the difference of the surface multiple reflections. Therefore this difference may not be the same as the difference between the subsurface signals (that are free from surface multiple reflections) and thus the difference is not an indication of changes in the subsurface between the date of recording the first signal and the date of recording the second signal.

In order to provide a method of carrying out at sea a time-lapse survey of a target layer in an underground formation in which non-repeatable effects caused by the surface multiple reflections can be suppressed in a simple manner, it is proposed in Applicant's International patent application to record the signals at substantially repeating sea conditions.

SUMMARY OF THE INVENTION

Applicant now proposes an alternative to this method, wherein the suppression of the effects of non-repeating surface multiples is obtained in a mathematical way.

To this end the method of marine time-lapse seismic surveying the subsurface, using a seismic source and a seismic receiver system. The source and receiver systems are positioned at known locations. A seismic data set is generated comprised of at least two signals at each receiver in response to at least two seismic sound waves, the sound waves being transmitted at two different sea states but, proximate in time such that changes in the subterranean formation would be negligible. In receiving the signal set, one can determine the two-way water travel times. After a predetermined time, in which it is expected that the subterranean formation conditions will have changed, the seismic source(s) and receiver(s) are positioned at the same place when the first seismic data set was generated. A seismic source emits a sound wave and the seismic receiver receives what will be called a "monitor signal" and the two-way water travel time is again determined. A model is then developed for the first and second seismic data sets in that includes the subsurface signal, changes in the subsurface signal and the effect of multiple reflections. A set of filter functions are then developed to filter out the multiple reflections based on the two-way water travel times of the first seismic data set. The first seismic data set, the second seismic data set and the filter function are then used to calculate the differences in the subsurface layers over the elapsed period of time between the two seismic data sets.

The above embodiment of the present invention is suitable when the seismic source and the at least one seismic receiver are not stationary, for example when they are part of a streamer.

A modification of the technique may be used when the at least one seismic receiver are stationary, for example they are permanently located at predetermined receiver locations, for example on the sea bottom, and the source is not stationary. In this case, the seismic source is located at a predetermined position. A first seismic data set consisting of at least two signals in response to two different sound waves, proximate in time such that the changes in the subsurface are negligible, is recorded and the two-way water travel time is again determined. At some later time, the seismic source is again placed at the predetermined position, and a second seismic data set of monitor signals is obtained and the steps are the same as set forth above.

Alternatively, both source and receiver(s) may be located at stationary, predetermined and fixed locations. The steps set forth for recording the seismic data sets, calculation of two-way water travel times, development of models, filters and calculation of changes in the subsurface formation are the same.

In the specification the word "multiples" will be used to refer to "surface multiple reflections." The two-way water travel time is twice the water depth divided by the sonic velocity.

BRIEF DESCRIPTION OF THE DRAWINGS

The invention will now be described by way of example with reference to the accompanying drawings, wherein.

DETAILED DESCRIPTION OF THE PREFERRED EMBODIMENT

Figure 1:
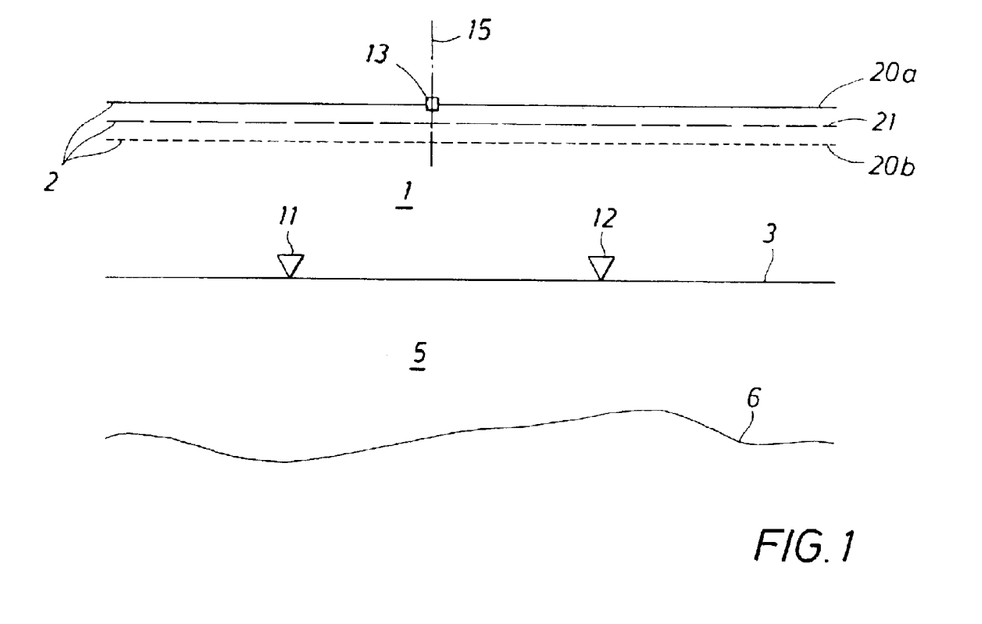
FIG. 1 shows schematically carrying out the surveying steps of the method of the present invention.

Reference is now made to FIG. 1. The method according to the present invention is a method of carrying out at sea a time-lapse survey of the subsurface. In FIG. 1 is shown schematically a body 1 of water representing the sea bounded by a sea surface 2 and a sea bottom 3, and the subsurface 5 below the sea bottom 3. Which subsurface 5 contains at least one reflector 6.

In the method according to the invention a seismic receiver system comprising at least one seismic receiver is located at a predetermined position. In FIG. 1 the seismic receiver system comprises two seismic receivers 11 and 12, and the receiver location having a predetermined position is at the sea bottom 3.

The first step of the method is positioning a seismic source 13 at a source location having a predetermined position 15. The position 15 is the horizontal position of the source, which is the longitude-latitude position of the seismic source 13. The horizontal position of the source is schematically shown as a dash-dot line. Vertically the seismic source is positioned at the sea surface 2.

It will be clear that at different times the sea surface will be at different levels, for example due to tidal differences. In FIG. 1 only three different levels are shown and these levels are referred to with reference numerals 20a, 20b and 21, respectively.

The present invention relates to carrying out at sea a time-lapse seismic survey, which implies carrying out an base seismic survey, carrying out a monitor survey at a later date and determining the differences between the base survey and the monitor survey to evaluate the changes in the underground formation that occurred between the two surveys.

In order to reduce the effects of multiples, the method according to the present invention comprises the step of recording when the seismic source 13 is at the horizontal position 15 for each seismic receiver 11, 12 a set of at least two repeat signals obtained from the seismic receiver 11 or 12 in response to a set of at least two sound waves emitted by the seismic source 13, wherein the at least two sound waves are emitted at different sea states (having sea levels 20a and 20b, respectively) but so closely in time that differences in the repeat signals due to changes in the subsurface 5 can be ignored. In addition, the two-way water travel times are measured when recording the repeat signals. We will be interested in the differences in two-way water travel times at the times of recording the signals so that the two-way water travel times may be measured at a fixed location during the survey. One way of doing this is to have a fixed sonic transducer on the sea floor 6 and picking and recording the two-way water travel times of pulses from the transducer reflected back from the sea surface 2.

The repeat signals pertaining to one of the at least two sound waves form the base survey.

Then, after a predetermined period of time, for example after one year, a monitor survey is conducted. To this end the seismic source 13 is again positioned at the horizontal position 15, wherein now the sea level is at 21. For each seismic receiver 11, 12 a monitor signal is recorded from the seismic receiver 11 or 12 in response to a sound wave emitted by the seismic source in the horizontal position 15, and the two-way water travel time is measured when recording the monitor signal.

Figure 2:
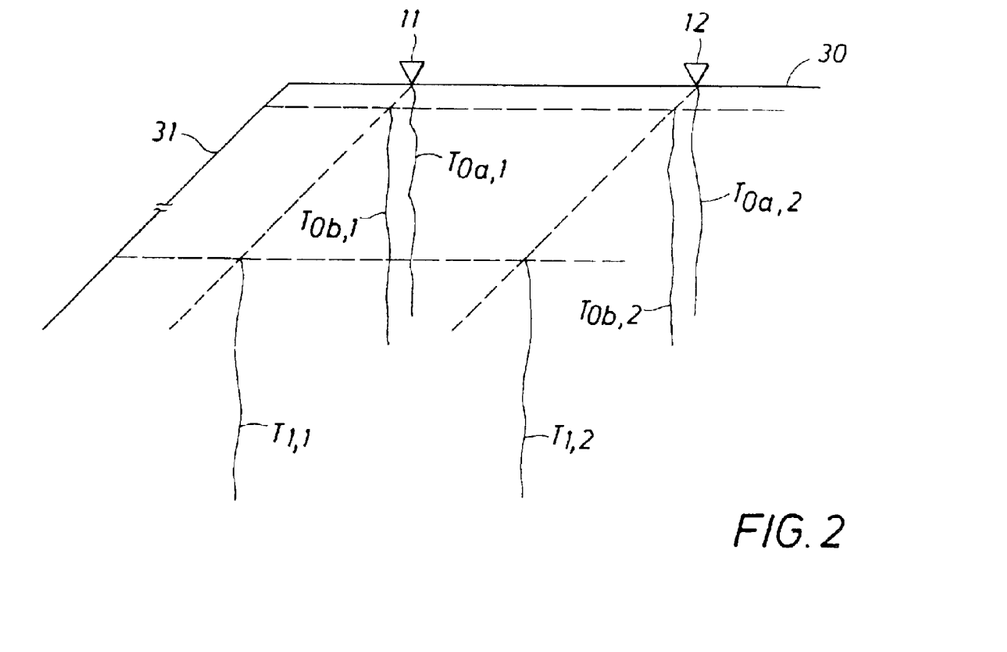
FIG. 2 shows schematically the way in which the signals are related.

These two steps will be illustrated with reference to FIG. 2. In FIG. 2, the seismic receivers 11 and 12 are located on axis 30, and axis 31 is the time-axis.

The two repeat signals recorded by each of the two seismic receivers 11 and 12 are $T_{0a,1}$ and $T_{0b,1}$ respectively for seismic receiver 11, and $T_{0a,2}$ and $T_{0b,2}$ respectively for seismic receiver 12. The recordings are made with the seismic source 13 in the horizontal position 15 (see FIG. 1) and so closely in time that the subsurface signal response does not change. In this example the repeat surveys are formed by the signals $T_{0a,1}(t)$ and $T_{0a,2}(t)$, and $T_{0b,1}(t)$ and $T_{0b,2}(t)$, and the base survey is formed by, for example $T_{0a,1}(t)$ and $T_{0a,2}(t)$.

The monitor survey, recorded later in time, comprises the monitor signals $T_{1,1}$ for seismic receiver 11 and $T_{1,2}$ for seismic receiver 12.

We will now discuss how the changes in the subsurface formation can be determined. To this end we first assume a model for the signal that includes the subsurface signal, differences in the subsurface signals due to changes in the subsurface, and the contributions of surface multiple reflections.

The model for a single signal (also called a trace) is given in the below model equation:

$$T_{i,j}(t) = P_{0,j}(t) + \Delta P_{0i,j}(t) + \sum_{k=1}^{n} M^k(t) \otimes g(t - kt_{si}) + N_{i,j}(t) \quad (1)$$

$T_{i,j}(t)$ is the i-th recording of the signal with the j-th seismic receiver (in this case j=1,2), $P_{0,j}(t)$ is the primary signal from the underground formation at the initial or base state as received by the j-th seismic receiver, $\Delta P_{0i,j}(t)$ is the difference between the i-th primary signal and the primary signal at the initial or base state for the j-th seismic receiver, this is the so-called time-lapse difference for the j-th seismic receiver, $$\sum_{k=1}^{n} M^k(t) \otimes g(t - kt_{si})$$

is the contribution of the multiples $M^k(t)$, wherein $g(t-kt_{si})$ is a spike function at time is $kt_{si}$, wherein $t_{si}$ is the known or measured two-way water travel time, wherein k is the order of the multiple and wherein $\otimes$ denotes convolution, $N_{i,j}(t)$ is the contribution of the noise to the i-th recording for the j-th seismic receiver.

A survey comprises the signals of all seismic receivers, and the i-th survey will be referred to as $T_i(t)$.

Please note that the two-way water travel time, $t_{si}$, represents the sea state, and that it can easily be measured separately from recording the signals $T_i(t)$.

We are interested in estimating the time-lapse difference $\Delta P_{0i,j}(t)$, because this difference is an indication of the changes in the subsurface formation, and in particular in a target layer located therein, with time elapsing between recording the base signal and recording a monitor signal at a later date.

In order to suppress the effect of the first order multiple, and assuming that the effects of the second and further multiples are negligible we can put n=1. Thus the model equation (1) is simplified to give the simplified model equation:

$$T_{i,j}(t) = P_{0,j}(t) + \Delta P_{0i,j}(t) + M^1(t) \otimes g(t-t_{si}) + N_{i,j}(t) \quad (2)$$

In the method according to the present invention two repeat signals are recorded at different sea states but spaced so close in time that $\Delta P_{0i,j}(t)$ can be ignored.
The two repeat signals are for each of the seismic receivers:

$$T_{0a,j}(t) = P_{0,j}(t) + M^1(t) \otimes g(t-t_{s0a}) + N_{0a,j}(t) \quad (3a)$$

$$T_{0b,j}(t) = P_{0,j}(t) + M^1(t) \otimes g(t-t_{s0b}) + N_{0b,j}(t) \quad (3b)$$

The monitor signal is recorded at a later date, and its signal is:

$$T_{1,j}(t) = P_{0,j}(t) + \Delta P_{01,j}(t) + M^1(t) \otimes g(t-t_{s1}) + N_{1,j}(t). \quad (4)$$

Thus we have three equations with three unknowns, $M^1(t)$, $P_{01,j}(t)$ and $\Delta P_{01,j}(t)$, wherein we want to eliminate the first two unknowns in order to get an estimate of $\Delta P_{01,j}(t)$. The base survey is for example $T_{0a}(t)$.

The three equations can be simplified using the shorthand notation of Table 1 as follows to give the three model equation, two for the repeat signals and one for the monitor signal:

$$T_{0a,j}(t) = P_{0,j}(t) + M^1(t) \otimes g^1_{s0a} + N_{0a,j}(t) \quad (5a)$$

$$T_{0b,j}(t) = P_{0,j}(t) + M^1(t) \otimes g^1_{s0b} + N_{0b,j}(t) \quad (5b)$$

$$T_{1,j}(t) = P_{0,j}(t) + \Delta P_{01,j}(t) + M^1(t) \otimes g^1_{s1} + N_{1,j}(t) \quad (5c)$$

It is an object of the present invention to eliminate $M^1$ and $P_{0i,j}(t)$, and to obtain an estimate $\langle \Delta P_{01,j}(t) \rangle$ of the time-lapse difference for each of the seismic receivers j.

At first we will discuss obtaining the estimated time-lapse difference in case the sea states pertaining to the monitor survey and the repeat surveys differ ($ts1 \neq t_{s0a} \neq t_{s0b}$), and then we will discuss the case in which the sea state pertaining to the monitor survey is substantially the same as the sea state pertaining to one of the two repeat surveys ($t_{s1} \approx t_{s0a} \neq t_{s0b}$).

We start with the case that the three sea states differ. The method comprises first subtracting the two repeat signals from each other and then subtracting the two repeat signals from the monitor signal, these subtractions give following three equations:

$$T_{0b,j}(t) - T_{0a,j}(t) = M^1(t) \otimes (g^1_{s0b} - g^1_{s0a}) + N_{0b,j}(t) - N_{0a,j}(t) \quad (6a)$$

$$T_{1,j}(t) - T_{0a,j}(t) = \Delta P_{01,j}(t) + M^1(t) \otimes (g^1_{s1} - g^1_{s0a}) + N_{1,j}(t) - N_{0a,j}(t) \quad (6b)$$

$$T_{1,j}(t) - T_{0b,j}(t) = \Delta P_{01,j}(t) + M^1(t) \otimes (g^1_{s1} - g^1_{s0b}) + N_{1,j}(t) - N_{0b,j}(t) \quad (6c)$$

These three equations can be simplified as follows, to obtain the repeat difference equation and the two repeat-monitor difference equations:

$$T_{ba,j}(t) = M^1(t) \otimes G^1_{ba} + N_{ba,j}(t) \quad (7a)$$

$$T_{10a,j}(t) = \Delta P_{01,j}(t) + M^1(t) \otimes G^1_{10a} + N_{10a,j}(t) \quad (7b)$$

$$T_{10b,j}(t) = \Delta P_{01,j}(t) + M^1(t) \otimes G^1_{10b} + N_{10b,j}(t) \quad (7c)$$

The latter two equations are the two so-called time-lapse difference equations and we are interested in estimating the time-lapse difference $\Delta P_{0i,j}(t)$.

The sum (divided by two) of the two time-lapse difference equations is:

$$\frac{T_{10a,j}(t) + T_{10b,j}(t)}{2} = \quad (8)$$

$$\Delta P_{01,j}(t) + M^1(t) \otimes \left(\frac{G^1_{10a} + G^1_{10b}}{2}\right) + \frac{N_{10a,j}(t) + N_{10b,j}(t)}{2}$$

Now the following filter function is defined:

$$F(t) = \left(\frac{G^1_{10a} + G^1_{10b}}{2}\right) \otimes (G^1_{ba})^{-1} \quad (9)$$

Convolving the repeat difference equation (7a) with the filter function (9) gives:

$$T_{ba,j}(t) \otimes F(t) = M^1(t) \otimes \left(\frac{G^1_{10a} + G^1_{10b}}{2}\right) + N_{ba,j}(t) \otimes F(t) \quad (10)$$

Subtracting equation (10) from equation (8) gives:

$$\frac{T_{10a,j}(t) + T_{10b,j}(t)}{2} - T_{ba,j}(t) \otimes F(t) = \quad (11)$$

$$\Delta P_{01,j}(t) + \frac{N_{10a,j}(t) + N_{10b,j}(t)}{2} - N_{ba,j}(t) \otimes F(t) = \langle \Delta P_{01,j}(t) \rangle$$

The left-hand side of this equation is an estimate of the time-lapse difference, $\langle \Delta P_{01,j}(t) \rangle$, for each of the seismic receivers, which gives:

$$\langle \Delta P_{01,j}(t) \rangle = \frac{T_{10a,j}(t) + T_{10b,j}(t)}{2} - T_{ba,j}(t) \otimes F(t) \quad (12)$$

This simple equation gives an estimate for each of the seismic receivers j of the difference between the initial or base recording for that seismic receiver and the monitor recording, wherein the effect of the first order multiple is suppressed. The estimated differences can be outputted in many ways that are known in the art, for example as vertical or horizontal sections. Alternatively attributes of the estimated differences can be computed and outputted.

Please note that the filter function F(t) is a known or measured function of the sea-states only for a given horizontal position 15, and as we will show later, the filter function is a function of the differences in sea-states.

For the embodiment shown in the Figures, equation (12) becomes:

$$\langle \Delta P_{01,1}(t) \rangle = \frac{T_{10a,1}(t) + T_{10b,1}(t)}{2} - T_{ba,1}(t) \otimes F(t) \quad (13a)$$

and $$\langle \Delta P_{01,2}(t) \rangle = \frac{T_{10a,2}(t) + T_{10b,2}(t)}{2} - T_{ba,2}(t) \otimes F(t) \quad (13b)$$

It can be shown that in case the functions $g(t-t_{si})$ are delta functions, for which the Fourier Transform is $e^{-2\pi i s t_{si}}$, the Fourier Transform of the filter function F(t) is:

$$F(s) = \frac{e^{-2\pi i s t_{s1}} - (e^{-2\pi i s t_{s0a}} + e^{-2\pi i s t_{s0b}})/2}{e^{-2\pi i s t_{s0b}} - e^{-2\pi i s t_{s0a}}}. \quad (14)$$

Dividing the equation by $e^{-2\pi i s t_{s0b}}$ gives

-continued $$F(s) = \frac{e^{-2\pi i s t_{s1} + 2\pi i s t_{s0b}} - (e^{-2\pi i s t_{s0a} + 2\pi i s t_{s0b}} + 1)/2}{1 - e^{-2\pi i s t_{s0a} + 2\pi i s t_{s0b}}} \quad (15a)$$

or $$F(s) = \frac{e^{-2\pi i s (t_{s1} - t_{s0b})} - (e^{-2\pi i s (t_{s0a} - t_{s0b})} + 1)/2}{1 - e^{-2\pi i s (t_{s0a} - t_{s0b})}}. \quad (15b)$$

This shows that only the differences in two-way water travel times matter, the absolute values of the two-way water times are not relevant for the filter functions. Thus the filter functions are only functions of the differences in the sea-states. First we discuss the behaviour of the Fourier Transform of the filter function for small differences between the two-way water times, and then we investigate the conditions under which a pole in the Fourier Transform of the filter function can arise.

For small differences between the two-way water travel times and for small values of s, the filter function becomes:

$$F(s) = \frac{1 - 2\pi i s(t_{s1} - t_{s0b}) - (1 - 2\pi i s(t_{s0a} - t_{s0b}) + 1)/2}{1 - 1 + 2\pi i s(t_{s0a} - t_{s0b})} \quad (16)$$

$$= \frac{-2\pi i s(t_{s1} - t_{s0b}) + 2\pi i s(t_{s0a} - t_{s0b})/2}{2\pi i s(t_{s0a} - t_{s0b})}$$

$$= \frac{t_{s1} - (t_{s0a} + t_{s0b})/2}{t_{s0b} - t_{s0a}}$$

Consequently, the response of the filter function F(t) remains bounded if $t_{s0a} \neq t_{s0b}$. Preferably, the two repeat surveys should be recorded when the difference between the two-way water travel times is greatest. In this case the filter frequency response will be less than unity over the signal band and the noise $N_{ba,j}(t)$ will not be amplified.

The result of the above-described first method is that the first order multiple reflections are eliminated. In this method we did not assume that there were repeating sea states.

The denominator of the Fourier Transform of the filter function is $\text{Den}(s) = 1 - e^{-2\pi i s(t_{s0a} - t_{s0b})}$.

This can be rewritten as:

$$\text{Den}(s) = 1 - \cos 2\pi s(t_{s0a} - t_{s0b}) + i \sin 2\pi s(t_{s0a} - t_{s0b}) \quad (17)$$

$$= \frac{(1 - \cos 2\pi s(t_{s0a} - t_{s0b}))^2 + \sin^2 2\pi s(t_{s0a} - t_{s0b})}{1 - \cos 2\pi s(t_{s0a} - t_{s0b}) - i \sin 2\pi s(t_{s0a} - t_{s0b})}$$

$$= \frac{2(1 - \cos 2\pi s(t_{s0a} - t_{s0b}))}{1 - \cos 2\pi s(t_{s0a} - t_{s0b}) - i \sin 2\pi s(t_{s0a} - t_{s0b})}$$

A pole will occur when $1 - \cos 2\pi s(t_{s0a} - t_{s0b}) = 0$, or if $2\pi s(t_{s0a} - t_{s0b}) = 0, \pm 1, \pm 2$ and so on. In order to avoid the first pole, the two-way water travel times should be different. To avoid the next pole, the signals are suitably passed through a band-pass filter such that the frequencies are limited by the lowest frequencies for which a pole occurs, before the estimated differences are calculated. In this case the pass frequencies are limited by $$s = \pm \frac{1}{2\pi(t_{s0a} - t_{s0b})}.$$

Avoiding the pole is important so as not to amplify noise.

The first order multiple can also be suppressed using a modified version of the above described method. Suppose that the monitor recording is made at a sea state that is substantially equal to the sea state pertaining to the first of the two repeat measurements, in other words $t_{s1} \approx t_{s0a}$.

In this case we use the repeat difference equation and one of the two repeat-monitor difference equations to eliminate the first order multiple:

$$T_{ba,j}(t) = M^1(t) \otimes G^1_{ba} + N_{ba,j}(t) \quad (18a)$$

$$T_{10a,j}(t) = \Delta P_{01,j}(t) + M^1(t) \otimes G^1_{10a} + N_{10a,j}(t) \quad (18b)$$

Now the following filter function is defined by $$F'(t) = G^1_{10a} \otimes (G^1_{ba})^{-1} \quad (19)$$

And the estimate of the time-lapse difference is given below:

$$<\Delta P_{01,j}(t)> = T_{10a,j}(t) - T_{ba,j}(t) \otimes F'(t) \quad (20)$$

As above, frequency response of the Fourier Transform of the filter function F'(t) remains bounded if $t_{s0a} \neq t_{s0b}$. In this case higher order multiples will also be suppressed.

In order to explicitly suppress higher order multiples, more repeat signals have to be recorded. Thus in order to suppress the first and the second order multiples, three repeat signals have to be recorded. They are the following:

$$T_{0a,j}(t) = P_{0,j}(t) + \sum_{k=1}^{2} M^k(t) \otimes g(t - kt_{s0a}) + N_{0a,j}(t) \quad (21a)$$

$$T_{0b,j}(t) = P_{0,j}(t) + \sum_{k=1}^{2} M^k(t) \otimes g(t - kt_{s0b}) + N_{0b,j}(t) \quad (21b)$$

$$T_{0c,j}(t) = P_{0,j}(t) + \sum_{k=1}^{2} M^k(t) \otimes g(t - kt_{s0c}) + N_{0c,j}(t) \quad (21c)$$

These equations can be simplified to give the simplified repeat survey equations:

$$T_{0a,j}(t) = P_{0,j}(t) + \sum_{k=1}^{2} M^k(t) \otimes g^k_{s0a} + N_{0a,j}(t) \quad (22a)$$

$$T_{0b,j}(t) = P_{0,j}(t) + \sum_{k=1}^{2} M^k(t) \otimes g^k_{s0b} + N_{0b,j}(t) \quad (22b)$$

$$T_{0c,j}(t) = P_{0,j}(t) + \sum_{k=1}^{2} M^k(t) \otimes g^k_{s0c} + N_{0c,j}(t) \quad (22c)$$

The monitor survey has the following equation:

$$T_{1,j}(t) = P_{0,j}(t) + \Delta P_{01,j}(t) + \sum_{k=1}^{2} M^k(t) \otimes g(t - kt_{s1}) + N_{1,j}(t). \quad (23)$$

Thus we have four equations with four unknowns, $M^1(t)$, $M^2(t)$, $P_{01,j}(t)$ and $\Delta P_{01,j}(t)$, wherein we want to eliminate the first three unknowns in order to get an estimate of $\Delta P_{01,j}(t)$. One way of solving this system of four equations will be discussed below.

Subtracting pairwise equations (10a)–(10c), and using the shorthand notation, we get the three repeat difference equations:

$$T_{ba,j}(t) = M^1(t) \otimes G^1_{ba} + M^2(t) \otimes G^2_{ba} + N_{ba,j}(t) \quad (24a)$$

$$T_{cb,j}(t) = M^1(t) \otimes G^1_{cb} + M^2(t) \otimes G^2_{cb} + N_{cb,j}(t) \quad (24b)$$

$$T_{ac,j}(t) = M^1(t) \otimes G^1_{ac} + M^2(t) \otimes G^2_{ac} + N_{ac,j}(t) \quad (24c)$$

The first multiple reflection can be eliminated from these three equations in several ways. Suitably, the elimination is done using the function having the largest difference in two-way water travel times, let this be $G^1_{ac} = (g_{s0a} - g_{s0c})$.

Now define a first filter function $$K(t) = G^1{}_{ba}\otimes_{(x)} (G^1{}_{ac})^{-1} \qquad (25)$$

Convolve the third repeat difference equation (24c) with the first filter function K(t) and subtract the result from the first repeat difference equation (24a). Define then a second filter function $$L(t) = G^1{}_{cb}\otimes_{(x)} (G^1{}_{ac})^{-1} \qquad (26)$$

and convolve the third repeat difference equation (24c) with L(t) and subtract the result from the second repeat difference equation (24b). The resulting two equations become:

$$T_{ba,j}(t) - T_{ac,j}(t)\otimes_{(x)} K(t) = M^2(t)\otimes_{(x)} (G^2{}_{ba} - G^2{}_{ac}\otimes_{(x)} K(t)) + N_{ba,j}(t) - N_{ac,j}(t)\otimes_{(x)} K(t) \qquad (27a)$$

and $$T_{cb,j}(t) - T_{ac,j}(t)\otimes_{(x)} L(t) = M^2(t)\otimes_{(x)} (G^2{}_{cb} - G^2{}_{ac}\otimes_{(x)} L(t)) + N_{cb,j}(t) - N_{ac,j}(t)\otimes_{(x)} L(t) \qquad (27b)$$

The monitor survey can be simplified to give the simplified monitor equation:

$$T_{1,j}(t) = P_{0,j}(t) + \Delta P_{01,j}(t) + \sum_{k=1}^{2} M^k(t)\otimes g^k_{ts,j} + N_{1,j}(t) \qquad (28)$$

Let the repeat survey $T_{0a}(t)$ have a two-way water travel time that is closest to the two-way water travel time of the monitor survey. Then select the first repeat survey equation (22a) as the one used to estimate the time-lapse difference. Subtracting this equation from simplified monitor survey equation (28) gives in simplified form:

$$T_{10a,j}(t) = \Delta P_{01,j}(t) + \sum_{k=1}^{2} M^k(t)\otimes G^k_{10a} + N_{10a,j}(t) \qquad (29)$$

Now define a third filter function $$O(t) = G^1{}_{10a}\otimes_{(x)} (G^1{}_{ac})^{-1} \qquad (30)$$

The third repeat difference equation (24c) is convolved with the third filter function. The result is subtracted from the simplified monitor survey equation (29) and this gives:

$$T_{10a,j}(t) - T_{ac,j}(t)\otimes_{(x)} O(t) = \Delta P_{01,j}(t) + M^2(t)\otimes_{(x)} (G^2{}_{10a} - G^2{}_{ac}\otimes_{(x)} O(t)) + N_{10a,j}(t) - N_{ac,j}(t)\otimes_{(x)} O(t) \qquad (31)$$

We now define a fourth filter function $$Q(t) = (G^2{}_{10a} - G^2{}_{ac}\otimes_{(x)} O(t))\otimes_{(x)} (G^2{}_{ba} - G^2{}_{ac}\otimes_{(x)} K(t))^{-1} \qquad (32)$$

Equation (27a) is convolved with the fourth filter function, and the result is subtracted from equation (31). This gives:

$$T_{10a,j}(t) - T_{ac,j}(t)\otimes O(t) - (T_{ba,j}(t) - T_{ac,j}(t)\otimes K(t))\otimes Q(t) = \qquad (33)$$
$$\Delta P_{01,j}(t) + N_{10a,j}(t) - N_{ac,j}(t)\otimes O(t) -$$
$$(N_{ba,j}(t) - N_{ac,j}(t)\otimes K(t))\otimes Q(t) = \langle \Delta P_{01,j}(t)\rangle$$

Thus the estimate of the estimate of the time-lapse difference is:

$$\langle \Delta P_{01,j}(t)\rangle = T_{10a,j}(t) - T_{ac,j}(t)\otimes_{(x)} O(t) - (T_{ba,j}(t) - T_{ac,j}(t)\otimes_{(x)} K(t))\otimes_{(x)} Q(t) \qquad (34)$$

Equation (19) is a simple equation that can be used to remove the first two multiples.

Each of the filter functions K(t), L(t), O(t) and Q(t) is made up of the differences of spike functions $g(t - kt_{si})$. These filter functions can be made stable by the proper choice of different repeat surveys over the sea states at times so selected that the $t_{s0i}$'s are not equal. The frequencies at which the Fourier Transforms of the filter functions have a pole have to be determined, in order to determine the pass frequencies of the band-pass filter.

It will be understood that other methods for solving the system of four equations can be suitable as well.

Each filter function is the convolution of a function of time and an inverse function of time. The inverse function of time can be defined using the Fourier Transform. The Fourier Transform of a function f(t) of time is $$F(s) = \int_{-\infty}^{\infty} f(t)\cdot e^{-2i\pi st}\,dt.$$

The inverse function of time is $(f(t))^{-1}$ so selected that its Fourier Transform is $1/F(s)$.

As we go to higher frequencies, we will use the two-way water travel time measurement of the sea state, measured from the sea floor, to measure both the two-way water travel time and the effective sea surface reflection response as it changes with the surface wave conditions. In this case the spike functions $g(t - kt_{si})$ will broaden slightly to become high cut filters. However, the above-discussed methodology remains unchanged.

The seismic receiver system shown in FIG. 1 comprises two seismic receivers, 11 and 12. Any suitable number of seismic receivers can be used. The seismic receivers need not be arranged on a line, they can be arranged in any three-dimensional array as long as their predetermined positions are the same for all surveys. Suitably the seismic receivers are permanently located, for example on the sea floor or in a well. In addition, also the seismic sources can be permanently located in a predetermined position, for example on the sea floor or in a well.

Figure 3:
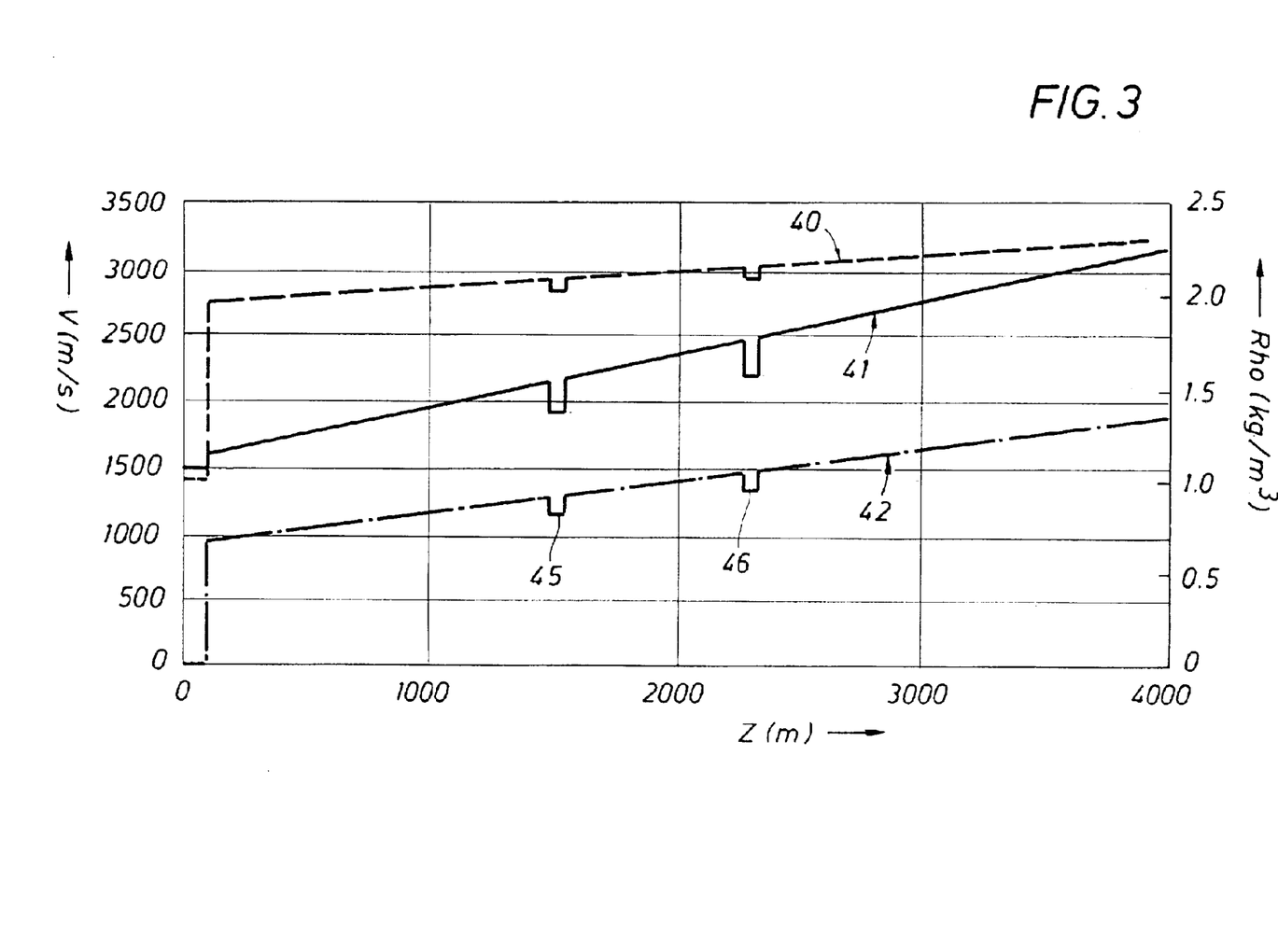
FIG. 3 shows the relevant parameters of a model used in a hypothetical example illustrating the present invention.

The method according to the present invention will now be demonstrated with the aid of a hypothetical example of marine time-lapse surveying. In the example a two-dimensional model was used of a subsurface formation under a layer of 100 m of water. The relevant parameters of the model are shown in FIG. 3. In FIG. 3 are shown as a function of the depth Z, the density 40, the velocity of the P-waves 41 and the velocity of the S-waves 42. Reference number 45 and 46 point to two thick sand layers. The thickness of the layers 45 and 46 is so selected that the top and the base reflections will be separated. For each survey one shot of a seismic source at the surface of the water was used and the reflections were received by several seismic receivers arranged at predetermined positions on the see floor with a spacing of 1 m.

Figure 4:
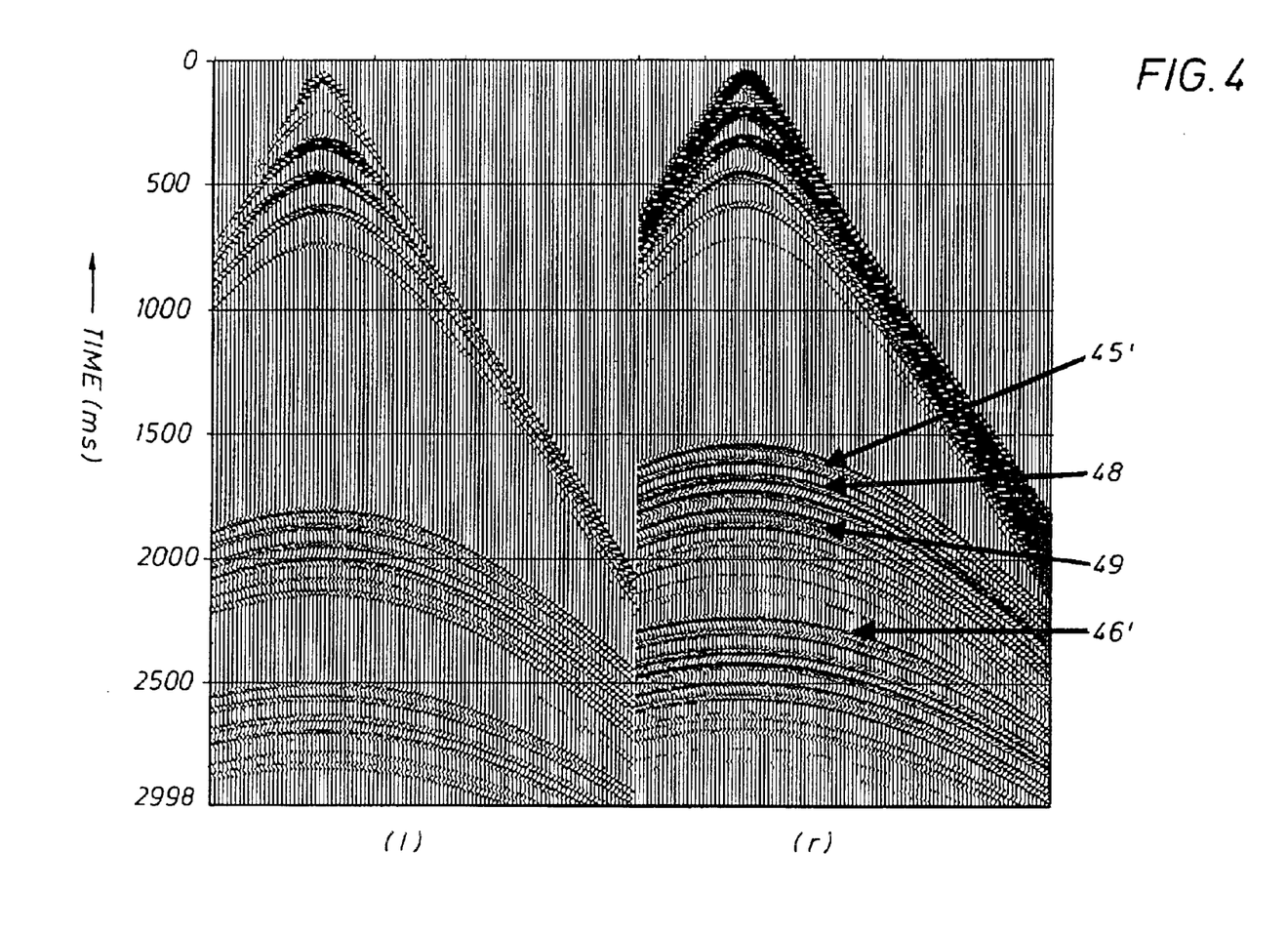
FIG. 4 shows the base survey and the difference survey determined according to the invention for the hypothetical example.

The right-hand picture in FIG. 4 shows the computed base survey, which comprises the first repeat signals received by the receivers in response to a sound wave emitted from the seismic source, wherein each signal is a vertical (wiggled) trace. The set of signals is called the survey. The tide of the first repeat survey was 0 m. Reference numerals 45' and 46' point to the primary reflections from the thick layers 45 and 46 (see FIG. 3). Reference numerals 48 and 49 point to first order and second order surface multiple reflections, respectively.

The second repeat signals were computed with a tide of 6 m for the same arrangement of the source and the receivers. The monitor signals were computed with a tide of 3 m for the same arrangement of the source and the receivers. The second repeat survey and the monitor survey are not shown.

We assumed a model that is given below, which is equation (1) without noise:

$$T_{i,j}(t) = P_{0,j}(t) + \Delta P_{0i,j}(t) + \sum_{k=1}^{n} M^k(t) \otimes g(t - kt_{si}) \quad (35)$$

It is assumed that no changes have occurred in the subsurface between the repeat surveys and the monitor survey. The resulting difference survey obtained with the method according to the present invention is shown in the left-hand picture in FIG. 4, wherein for each receiver the difference is computed in accordance with equation (20), $$<\Delta P_{01,j}(t)> = T_{10a,j}(t) - T_{ba,j}(t) \otimes F'(t),$$

wherein the filter function is defined as $F'(t) = G^1_{10a} \otimes (G^1_{ba})^{-1}$.

FIG. 4 shows clearly that the primaries do not occur and that the first order surface multiple reflections are almost completely removed.

Figure 5:
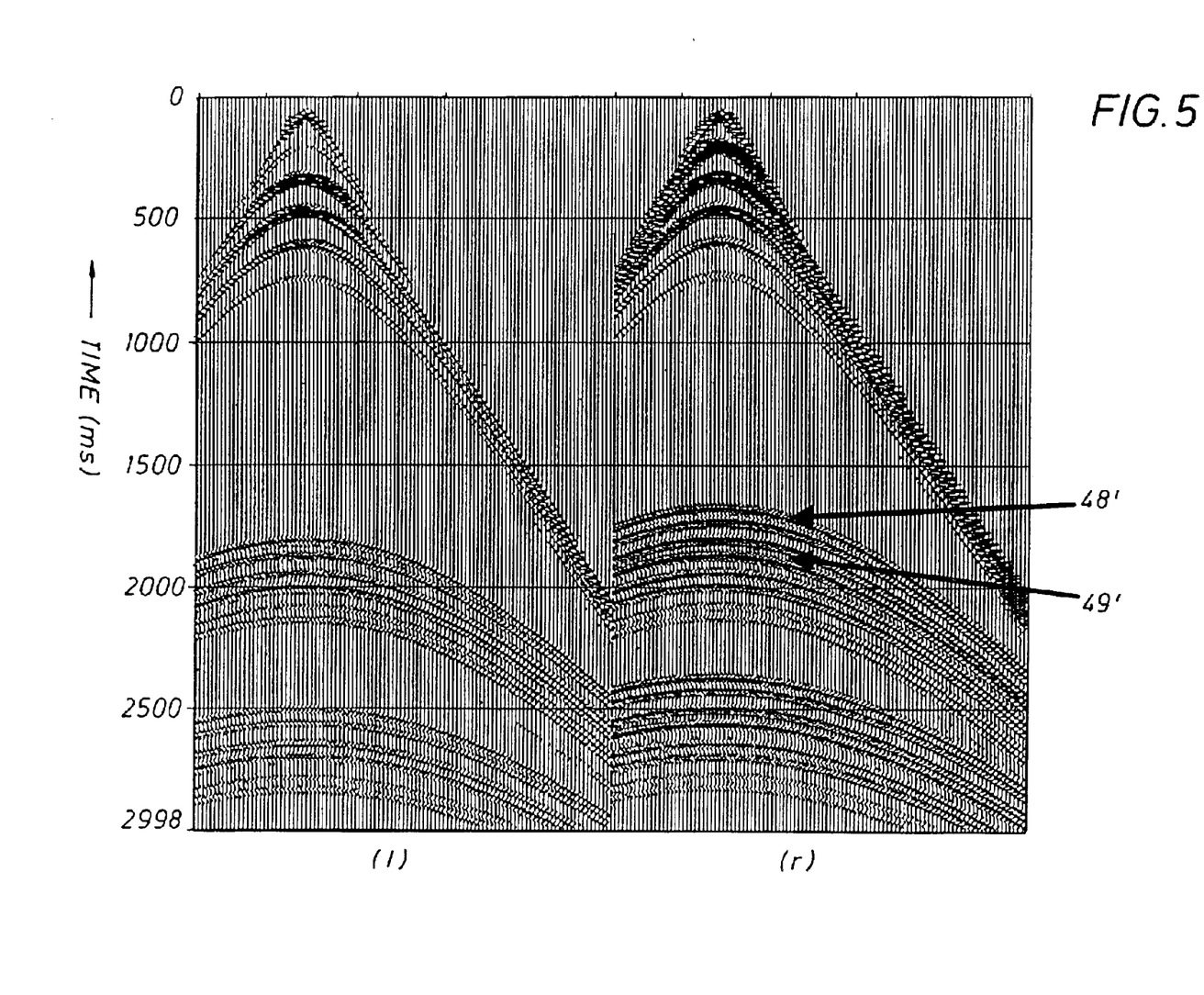
FIG. 5 shows the results of a normal marine time-lapse survey and the difference survey determined according to the invention for the hypothetical example.

To illustrate the differences with a normal marine time-lapse survey, we refer to FIG. 5. The right-hand picture of FIG. 5 shows the results of the normal marine time-lapse survey, wherein the monitor survey had been subtracted from the first repeat survey. Clearly can be seen that the first order and second order surface multiple reflections 48' and 49' are not removed. For the sake of completeness the left-hand picture of FIG. 5 is identical to the left-hand picture of FIG. 4.

Figure 6:
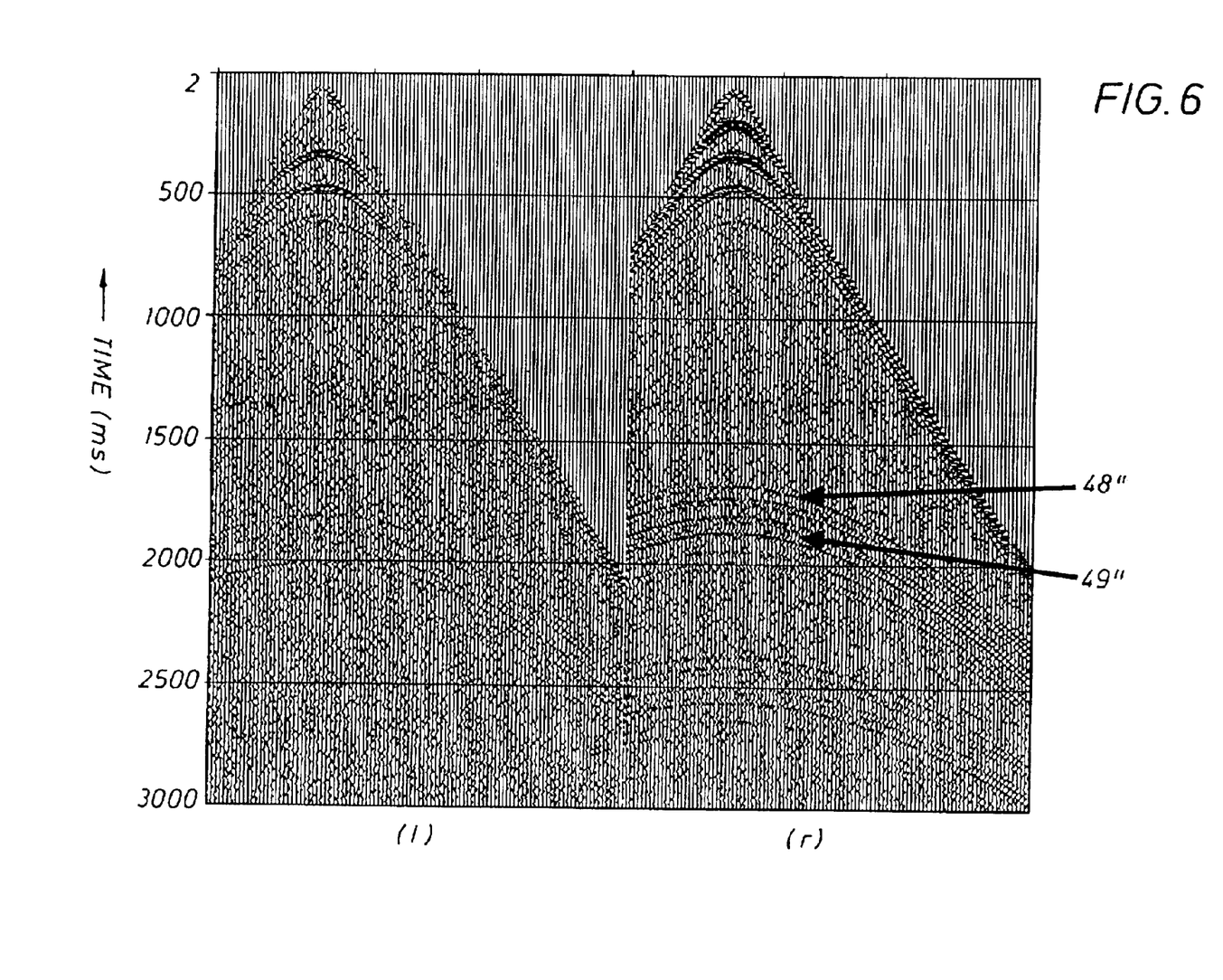
FIG. 6 shows the results of a normal marine time-lapse survey and the difference survey determined according to the invention for the hypothetical example, with added uncorrelated noise.

FIG. 6 shows the effect of noise added to the signals of the survey. The model for a signal is then $$T_{i,j}(t) = P_{0,j}(t) + \Delta P_{0i,j}(t) + \sum_{k=1}^{n} M^k(t) \otimes g(t - kt_{si}) + N_{i,j}(t),$$

wherein $N_{i,j}(t)$ is the noise. The added noise was random and uncorrelated and the noise amplitude was so selected that the signal-to-noise ratio was about 1. The right-hand picture of FIG. 6 shows the normal marine time-lapse survey, wherein the monitor survey had been subtracted from the first repeat survey, whereas the left-hand picture of FIG. 6 shows the difference with the filter according to the present invention applied. The first order and second order surface multiples that are clearly shown in the right-hand picture (reference numerals 48'' and 49'') do not appear in the left-hand picture.

In the example, all signals were passed through a band-pass filter to avoid a pole at around 116 Hz.

In the above we discussed the present invention with reference to one seismic source. When each of the surveys include multiple shots and the time between two shots is such that it is expected that the two-way water travel time has changed, the two-way water travel time has to be measured for each of the shots, and the filter functions have to be determined for each of the shots and allocated to that shot. It will be understood that the horizontal position of the sources should be the same for all the surveys.

In case later monitor surveys are made, one needs to repeat the steps of:

positioning after a predetermined period of time the seismic source at the location of step (a), recording for each seismic receiver a monitor signal from the seismic receiver in response to a sound wave emitted by the seismic source, and measuring the two-way water travel time when recording the monitor signal;

assuming a model for the signal that includes the subsurface signal, differences in the subsurface signals due to changes in the subsurface, and the contributions of surface multiple reflections;

determining a set of filter functions that enable eliminating the surface multiple reflections, which filter function(s) are functions of the measured two-way water travel times at the position of the seismic source;

calculating for each receiver the estimated differences in the subsurface signals from the repeat signals, the monitor signal and the filter function(s), which estimated difference is a measure of changes in the subsurface signal caused by changes in the target layer in the time elapsed between recording the repeat signals and recording the monitor signal; and outputting the estimated difference.

In the above, particular specific examples from many possible realisations of this invention have been discussed. It will be understood that from a multiplicity of repeat surveys that sample the rapidly but measured or known sea states and the more slowly varying subsurface signal changes we can separate out, and suppress the surface multiple differences from the changes in the subsurface signal. In this case, it is a repetition of the method according to the invention, because new repeat surveys take the place of previous ones.

In another realisation one can compute several trial multiple suppressions by substituting in our multiple suppression procedure a range of sea states close to the sea state at which a monitor survey was actually conducted. This will produce an ensemble of multiple suppressed difference results and we can choose by inspection the result with best suppression. If we view the suppressions as a movie on a workstation one can see the multiples diminish to a minimum and then come back as we scan through and past the best monitor sea state parameter. This can be used to optimize the joint suppression of 1st and higher order multiples. The optimum parameter for a joint suppression of first and second order multiples would be such as to give a monitor to base sea state parameter difference somewhere between the true value and twice this, depending upon the relative strengths of first and second order multiples at target level.

This scanning would also add robustness with respect to small two-way time measurement errors.

In the above we discussed that, in order to avoid a pole in the Fourier Transform of the filter functions, the signals were passed through a band-pass filter. Alternatively, a large number of base surveys can be taken, and surveys can be so selected that the two-way water travel times for the base survey are equal to or close to the monitor survey. This will result in good suppression of all orders of surface multiples and a base sea state difference may be chosen such that the high frequency pole is outside the frequency band of the monitor survey. In this way the monitor signals need not be passed through a band-pass filter. The base sea state difference is the difference of the two-way water travel times pertaining to the repeat surveys.

The present invention provides a simple method that allows separating out and suppressing surface multiples from the changes in the subsurface signal. While the present invention has been described in terms of various embodiments, modifications in the apparatus and techniques described herein without departing from the concept of the present invention. It should be understood that the embodiments and techniques described in the foregoing are illustrative and are not intended to operate as a limitation on the scope of the invention.

TABLE 1

Shorthand notations used in the equations.

$g^1_{s0a} = g(t - t_{s0a})$
$g^1_{s0b} = g(t - t_{s0b})$
$g^1_{s0c} = g(t - t_{s0c})$

TABLE 1-continued

Shorthand notations used in the equations.

$g^1_{s1} = g(t - t_{s1})$
$g^2_{s0a} = g(t - 2t_{s0a})$
$g^2_{s0b} = g(t - 2t_{s0b})$
$g^2_{s0c} = g(t - 2t_{s0c})$
$g^2_{s1} = g(t - 2t_{s1})$
$G^1_{ba} = g^1_{s0b} - g^1_{s0a}$
$G^1_{cb} = g^1_{s0c} - g^1_{s0b}$
$G^1_{ac} = g^1_{s0a} - g^1_{s0c}$
$G^2_{ba} = g^2_{s0b} - g^2_{s0a}$
$G^2_{cb} = g^2_{s0c} - g^2_{s0b}$
$G^2_{ac} = g^2_{s0a} - g^2_{s0c}$
$G^1_{10a} = g^1_{s1} - g^1_{s0a}$
$G^1_{10b} = g^1_{s1} - g^1_{sb}$
$G^2_{10a} = g^2_{s1} - g^2_{s0a}$
$N_{ba,j}(t) = N_{0b,j}(t) - N_{0a,j}(t)$
$N_{cb,j}(t) = N_{0c,j}(t) - N_{0b,j}(t)$
$N_{ac,j}(t) = N_{0a,j}(t) - N_{0c,j}(t)$
$N_{10a,j}(t) = N_{1,j}(t) - N_{0a,j}(t)$
$N_{10b,j}(t) = N_{1,j}(t) - N_{0b,j}(t)$
$T_{ba,j}(t) = T_{0b,j}(t) - T_{0a,j}(t)$
$T_{ba,1}(t) = T_{0b,1}(t) - T_{0a,1}(t)$
$T_{ba,2}(t) = T_{0b,2}(t) - T_{0a,2}(t)$
$T_{ac,j}(t) = T_{0a,j}(t) - T_{0c,j}(t)$
$T_{cb,j}(t) = T_{0c,j}(t) - T_{0b,j}(t)$
$T_{10a,j}(t) = T_{1,j}(t) - T_{0a,j}(t)$
$T_{10b,j}(t) = T_{1,j}(t) - T_{0b,j}(t)$

What is claimed is:

1. A method of marine time-lapse seismic surveying the subsurface, using a seismic source and a seismic receiver system comprising at least one seismic receiver, the steps comprising:

(a) positioning the seismic source at a source location having a predetermined position, and positioning the at least one seismic receiver of the seismic receiver system at a receiver location having predetermined position;

(b) recording for these source and receiver locations for each seismic receiver a set of at least two repeat signals obtained from the seismic receiver in response to a set of at least two sound waves emitted by the seismic source, wherein the at least two sound waves are emitted at different sea states but so closely in time that differences in the repeat signals due to changes in the subsurface can be ignored, and measuring the two-way water travel times when recording the repeat signals;

(c) positioning after a predetermined period of time the seismic source and the at least one seismic receiver at the source and receiver locations of step (a), recording for each seismic receiver a monitor signal from the seismic receiver in response to a sound wave emitted by the seismic source, and measuring the two-way water travel time when recording the monitor signal;

(d) assuming a model for the signal that includes the subsurface signal, differences in the subsurface signals due to changes in the subsurface, and the contributions of surface multiple reflections;

(e) determining a set of filter functions that enable eliminating the surface multiple reflections, which filter function(s) are functions of the measured two-way water travel times at the position of the seismic source of step (a);

(f) calculating for each receiver the estimated differences in the subsurface signals from the repeat signals, the monitor signal and the filter function(s), which estimated difference is a measure of changes in the subsurface signal caused by changes in the target layer in the time elapsed between recording the repeat signals and recording the monitor signal; and (g) outputting the estimated difference.

2. A method of marine time-lapse seismic surveying the subsurface, using a seismic source and a seismic receiver system comprising at least one seismic receiver located at a predetermined receiver location, the steps comprising:

(a) positioning the seismic source at a source location having a predetermined position;

(b) recording for this source location for each seismic receiver a set of at least two repeat signals obtained from the seismic receiver in response to a set of at least two sound waves emitted by the seismic source, wherein the at least two sound waves are emitted at different sea states but so closely in time that differences in the repeat signals due to changes in the subsurface can be ignored, and measuring the two-way water travel times when recording the repeat signals;

(c) positioning after a predetermined period of time the seismic source at the source location of step (a), recording for each seismic receiver a monitor signal from the seismic receiver in response to a sound wave emitted by the seismic source, and measuring the two-way water travel time when recording the monitor signal;

(d) assuming a model for the signal that includes the subsurface signal, differences in the subsurface signals due to changes in the subsurface, and the contributions of surface multiple reflections;

(e) determining a set of filter functions that enable eliminating the surface multiple reflections, which filter function(s) are functions of the measured two-way water travel times at the position of the seismic source of step (a);

(f) calculating for each receiver the estimated differences in the subsurface signals from the repeat signals, the monitor signal and the filter function(s), which estimated difference is a measure of changes in the subsurface signal caused by changes in the target layer in the time elapsed between recording the repeat signals and recording the monitor signal; and (g) outputting the estimated difference.

3. A method of marine time-lapse seismic surveying the subsurface, using a seismic source located at a predetermined source location and a seismic receiver system comprising at least one seismic receiver located at a predetermined receiver location, the steps comprising:

(a) recording for each seismic receiver a set of at least two repeat signals obtained from the seismic receiver in response to a set of at least two sound waves emitted by the seismic source, wherein the at least two sound waves are emitted at different sea states but so closely in time that differences in the repeat signals due to changes in the subsurface can be ignored, and measuring the two-way water travel times when recording the repeat signals;

(b) recording after a predetermined period of time for each seismic receiver a monitor signal from the seismic receiver in response to a sound wave emitted by the seismic source, and measuring the two-way water travel time when recording the monitor signal;

(c) assuming a model for the signal that includes the subsurface signal, differences in the subsurface signals due to changes in the subsurface, and the contributions of surface multiple reflections;

(d) determining a set of filter functions that enable eliminating the surface multiple reflections, which filter function(s) are functions of the measured two-way water travel times;

(e) calculating for each receiver the estimated differences in the subsurface signals from the repeat signals, the monitor signal and the filter function(s), which estimated difference is a measure of changes in the subsurface signal caused by changes in the target layer in the time elapsed between recording the repeat signals and recording the monitor signal; and (f) outputting the estimated difference.

4. The method according to claim 1, further comprising repeating steps (c) through (g).

5. The method according to claim 2, further comprising repeating steps (c) through (g).

6. The method according to claim 3, further comprising repeating steps (b) through (f).

7. The method according to claim 1, wherein the signals are passed through a band-pass filter such that the pass frequencies are limited by frequencies for which a pole occurs in the Fourier Transform of the filter function, before the estimated differences are calculated.

8. The method according to claim 2, wherein the signals are passed through a band-pass filter such that the pass frequencies are limited by frequencies for which a pole occurs in the Fourier Transform of the filter function, before the estimated differences are calculated.

9. The method according to claim 3, wherein the signals are passed through a band-pass filter such that the pass frequencies are limited by frequencies for which a pole occurs in the Fourier Transform of the filter function, before the estimated differences are calculated.

* * * * *